(12) United States Patent
Pronske et al.

(10) Patent No.: US 7,882,692 B2
(45) Date of Patent: Feb. 8, 2011

(54) ZERO EMISSIONS CLOSED RANKINE CYCLE POWER SYSTEM

(75) Inventors: Keith L. Pronske, Wilton, CA (US); Roger E. Anderson, Gold River, CA (US); Fermin Viteri, Sacramento, CA (US)

(73) Assignee: Clean Energy Systems, Inc., Rancho Cordova, CA (US)

( * ) Notice: Subject to any disclaimer, the term of this patent is extended or adjusted under 35 U.S.C. 154(b) by 883 days.

(21) Appl. No.: 11/799,125

(22) Filed: Apr. 30, 2007

(65) Prior Publication Data

US 2007/0204620 A1  Sep. 6, 2007

Related U.S. Application Data

(62) Division of application No. 11/109,237, filed on Apr. 18, 2005, now abandoned.

(60) Provisional application No. 60/562,775, filed on Apr. 16, 2004, provisional application No. 60/562,792, filed on Apr. 16, 2004, provisional application No. 60/562,776, filed on Apr. 16, 2004.

(51) Int. Cl.
  *F02C 6/00* (2006.01)
(52) U.S. Cl. .................. 60/39.182; 60/39.6; 60/678
(58) Field of Classification Search ............ 60/39.182, 60/39.6, 649, 671, 678, 679
  See application file for complete search history.

(56) References Cited

U.S. PATENT DOCUMENTS

| | | |
|---|---|---|
| 864,017 A | 8/1907 | Miller |
| 886,274 A | 4/1908 | Tate |
| 1,013,907 A | 1/1912 | Taylor |
| 1,227,275 A | 5/1917 | Kraus |
| 1,372,121 A | 3/1921 | Davis |

(Continued)

FOREIGN PATENT DOCUMENTS

DE  1301821  8/1969

(Continued)

OTHER PUBLICATIONS

Reinkenhof, J. et al.; Steam Generation with Modified H2/O2—Rocket Engines; unknown date.

(Continued)

*Primary Examiner*—Hoang M Nguyen
(74) *Attorney, Agent, or Firm*—Heisler & Associates (57) ABSTRACT

A fuel combustion power generation system is provided operating as a closed loop Rankine cycle and with zero atmospheric emissions. The fuel is combusted with oxygen in a combustor to generate high temperature products of combustion. The products of combustion are routed to a first side of a heat exchanger. A second side of the heat exchanger has a working fluid of the closed loop Rankine cycle passed therethrough to boil the working fluid into a gas. The working fluid is then expanded, condensed back to a liquid and pumped back to high pressure for return to the heat exchanger the products of combustion enter a condenser, where gases are collected and liquids recirculated or released. The products of combustion can be expanded upstream of the heat exchanger. The fuel can be a gaseous fuel or a solid or liquid fuel, such as coal or biomass, with gasification before combustion.

27 Claims, 3 Drawing Sheets

U.S. PATENT DOCUMENTS

| | | |
|---|---|---|
| 1,820,755 A | 8/1931 | McMullen |
| 1,828,784 A | 10/1931 | Perrin |
| 2,004,317 A | 6/1935 | Forster |
| 2,033,010 A | 3/1936 | Russell |
| 2,078,956 A | 5/1937 | Lysholm |
| 2,168,313 A | 8/1939 | Bichowsky |
| 2,218,281 A | 10/1940 | Ridder |
| 2,359,108 A | 9/1944 | Hoskins |
| 2,368,827 A | 2/1945 | Hanson |
| 2,374,710 A | 5/1945 | Smith |
| 2,417,835 A | 3/1947 | Moore |
| 2,428,136 A | 9/1947 | Barr |
| 2,469,238 A | 5/1949 | Newton |
| 2,476,031 A | 7/1949 | Farkas |
| 2,478,682 A | 8/1949 | Blackwood |
| 2,487,435 A | 11/1949 | Goddard |
| 2,523,656 A | 9/1950 | Goddard |
| 2,547,093 A | 4/1951 | Ray |
| 2,563,028 A | 8/1951 | Goddard |
| 2,568,787 A | 9/1951 | Bosch |
| 2,582,938 A | 1/1952 | Eastman |
| 2,605,610 A | 8/1952 | Hermitte |
| 2,621,475 A | 12/1952 | Loy |
| 2,636,345 A | 4/1953 | Zoller |
| 2,654,217 A | 10/1953 | Rettaliata |
| 2,656,677 A | 10/1953 | Peterson |
| 2,662,373 A | 12/1953 | Sherry |
| 2,678,531 A | 5/1954 | Miller |
| 2,678,532 A | 5/1954 | Miller |
| 2,697,482 A | 12/1954 | Blizard |
| 2,717,491 A | 9/1955 | Barr |
| 2,722,100 A | 11/1955 | Goddard |
| 2,763,987 A | 9/1956 | Kretschmer |
| 2,770,097 A | 11/1956 | Walker |
| 2,832,194 A | 4/1958 | Kuhner |
| 2,869,324 A | 1/1959 | Foote |
| 2,884,912 A | 5/1959 | Lewis |
| 2,916,877 A | 12/1959 | Walter |
| 2,986,882 A | 6/1961 | Pavlecka |
| 3,038,308 A | 6/1962 | Fuller |
| 3,054,257 A | 9/1962 | Schelp |
| 3,101,592 A | 8/1963 | Robertson |
| 3,134,228 A | 5/1964 | Wolansky |
| 3,183,864 A | 5/1965 | Stengel |
| 3,238,719 A | 3/1966 | Harslem |
| 3,298,176 A | 1/1967 | Forsyth |
| 3,302,596 A | 2/1967 | Zinn |
| 3,315,467 A | 4/1967 | DeWitt |
| 3,331,671 A | 7/1967 | Goodwin |
| 3,335,565 A | 8/1967 | Aguet |
| 3,359,723 A | 12/1967 | Bohensky |
| 3,385,381 A | 5/1968 | Calaman |
| 3,423,028 A | 1/1969 | Stupakis |
| 3,459,953 A | 8/1969 | Hughes |
| 3,559,402 A | 2/1971 | Stone |
| 3,574,507 A | 4/1971 | Kydd |
| 3,608,529 A | 9/1971 | Smith |
| 3,623,324 A | 11/1971 | Eggenberger |
| 3,649,469 A | 3/1972 | MacBeth |
| 3,657,879 A | 4/1972 | Ewbank |
| 3,677,239 A | 7/1972 | Elkins |
| 3,693,347 A | 9/1972 | Kydd |
| 3,702,110 A | 11/1972 | Hoffman |
| 3,703,807 A | 11/1972 | Rice |
| 3,731,485 A | 5/1973 | Rudolph |
| 3,736,745 A | 6/1973 | Karig |
| 3,738,792 A | 6/1973 | Feng |
| 3,747,336 A | 7/1973 | Dibelius |
| 3,751,906 A | 8/1973 | Leas |
| 3,772,881 A | 11/1973 | Lange |
| 3,779,212 A | 12/1973 | Wagner |
| 3,792,690 A | 2/1974 | Cooper |
| 3,804,579 A | 4/1974 | Wilhelm |
| 3,807,373 A | 4/1974 | Chen |
| 3,826,080 A | 7/1974 | DeCorso |
| 3,831,373 A | 8/1974 | Flynt |
| 3,850,569 A | 11/1974 | Alquist |
| 3,854,283 A | 12/1974 | Stirling |
| 3,862,624 A | 1/1975 | Underwood |
| 3,862,819 A | 1/1975 | Wentworth |
| 3,928,961 A | 12/1975 | Pfefferle |
| 3,972,180 A | 8/1976 | Van Gelder |
| 3,978,661 A | 9/1976 | Cheng |
| 3,980,064 A | 9/1976 | Ariga |
| 3,982,878 A | 9/1976 | Yamane |
| 4,063,414 A | 12/1977 | Sata |
| 4,118,925 A | 10/1978 | Sperry |
| 4,118,944 A | 10/1978 | Lord |
| 4,133,171 A | 1/1979 | Earnest |
| 4,148,185 A | 4/1979 | Somers |
| 4,193,259 A | 3/1980 | Muenger |
| 4,194,890 A | 3/1980 | McCombs |
| 4,199,327 A | 4/1980 | Hempill |
| 4,224,299 A | 9/1980 | Barber |
| 4,224,991 A | 9/1980 | Sowa |
| 4,249,371 A | 2/1981 | Romeyke |
| 4,271,664 A | 6/1981 | Earnest |
| 4,273,743 A | 6/1981 | Barber |
| 4,291,539 A | 9/1981 | Potter |
| 4,297,841 A | 11/1981 | Cheng |
| 4,313,300 A | 2/1982 | Wilkes |
| 4,327,547 A | 5/1982 | Hughes |
| 4,377,067 A | 3/1983 | Sternfeld |
| 4,425,755 A | 1/1984 | Hughes |
| 4,426,842 A | 1/1984 | Collet |
| 4,434,613 A | 3/1984 | Stahl |
| 4,456,069 A | 6/1984 | Vigneri |
| 4,465,023 A | 8/1984 | Wagner |
| 4,498,289 A | 2/1985 | Osgerby |
| 4,499,721 A | 2/1985 | Cheng |
| 4,509,324 A | 4/1985 | Urbach |
| 4,519,769 A | 5/1985 | Tanaka |
| 4,528,811 A | 7/1985 | Stahl |
| 4,533,314 A | 8/1985 | Herberling |
| 4,549,397 A | 10/1985 | Cheng |
| 4,622,007 A | 11/1986 | Gitman |
| 4,631,914 A | 12/1986 | Hines |
| 4,657,009 A | 4/1987 | Zen |
| 4,674,463 A | 6/1987 | Duckworth |
| 4,680,927 A | 7/1987 | Cheng |
| 4,716,737 A | 1/1988 | Mandrin |
| 4,731,989 A | 3/1988 | Furuya |
| 4,765,143 A | 8/1988 | Crawford |
| 4,825,650 A | 5/1989 | Hosford |
| 4,841,721 A | 6/1989 | Patton |
| 4,845,940 A | 7/1989 | Beer |
| 4,884,529 A | 12/1989 | Byrnes |
| 4,899,537 A | 2/1990 | Cheng |
| 4,910,008 A | 3/1990 | Prudhon |
| 4,916,904 A | 4/1990 | Ramsaier |
| 4,928,478 A | 5/1990 | Maslak |
| 4,936,869 A * | 6/1990 | Minderman et al. ............ 48/77 |
| 4,942,734 A | 7/1990 | Markbreiter |
| 4,948,055 A | 8/1990 | Belcher |
| 4,982,568 A | 1/1991 | Kalina |
| 4,987,735 A | 1/1991 | DeLong |
| 5,050,375 A | 9/1991 | Dickinson |
| 5,055,030 A | 10/1991 | Schirmer |
| 5,069,031 A | 12/1991 | Shekleton |
| 5,088,450 A | 2/1992 | Sternfeld |
| 5,103,630 A | 4/1992 | Correa |
| 5,131,225 A | 7/1992 | Roettger |
| 5,175,994 A | 1/1993 | Fox |
| 5,175,995 A | 1/1993 | Pak |

| | | |
|---|---|---|
| 5,247,791 A | 9/1993 | Pak |
| 5,265,410 A | 11/1993 | Hisatome |
| 5,285,628 A | 2/1994 | Korenberg |
| 5,304,356 A | 4/1994 | Iijima |
| 5,323,603 A | 6/1994 | Malohn |
| 5,329,758 A | 7/1994 | Urbach |
| 5,353,589 A | 10/1994 | Althaus |
| 5,363,642 A | 11/1994 | Frutschi |
| 5,364,611 A | 11/1994 | Iijima |
| 5,413,879 A | 5/1995 | Domeracki |
| 5,417,053 A | 5/1995 | Uji |
| 5,449,568 A | 9/1995 | Micheli |
| RE35,061 E | 10/1995 | Correa |
| 5,473,899 A | 12/1995 | Viteri |
| 5,479,781 A | 1/1996 | Fric |
| 5,482,791 A | 1/1996 | Shingai |
| 5,490,377 A | 2/1996 | Janes |
| 5,491,969 A | 2/1996 | Cohn |
| 5,511,971 A | 4/1996 | Benz |
| 5,516,359 A | 5/1996 | Kang |
| 5,535,584 A | 7/1996 | Janes |
| 5,541,014 A | 7/1996 | Micheli |
| 5,557,936 A | 9/1996 | Drnevich |
| 5,572,861 A | 11/1996 | Shao |
| 5,572,871 A | 11/1996 | Kalina |
| 5,581,997 A | 12/1996 | Janes |
| 5,590,518 A | 1/1997 | Janes |
| 5,590,528 A | 1/1997 | Viteri |
| 5,617,719 A | 4/1997 | Ginter |
| 5,628,184 A | 5/1997 | Santos |
| 5,636,980 A | 6/1997 | Young |
| 5,644,911 A | 7/1997 | Huber |
| 5,678,408 A | 10/1997 | Janes |
| 5,678,647 A | 10/1997 | Wolfe |
| 5,679,134 A | 10/1997 | Brugerolle |
| 5,680,764 A | 10/1997 | Viteri |
| 5,687,560 A | 11/1997 | Janes |
| 5,709,077 A | 1/1998 | Beichel |
| 5,715,673 A | 2/1998 | Beichel |
| 5,724,805 A | 3/1998 | Golomb |
| 5,761,896 A | 6/1998 | Dowdy |
| 5,802,840 A | 9/1998 | Wolf |
| 5,852,925 A | 12/1998 | Prasad |
| 5,906,806 A | 5/1999 | Clark |
| 5,955,039 A | 9/1999 | Dowdy |
| 5,956,937 A | 9/1999 | Beichel |
| 5,968,680 A | 10/1999 | Wolfe |
| 5,970,702 A | 10/1999 | Beichel |
| 5,997,595 A | 12/1999 | Yokohama |
| 6,024,029 A * | 2/2000 | Clark ................ 110/216 |
| 6,105,369 A | 8/2000 | Peletz, Jr. |
| 6,170,264 B1 | 1/2001 | Viteri |
| 6,196,000 B1 | 3/2001 | Fassbender |
| 6,206,684 B1 | 3/2001 | Mueggenburg |
| 6,233,914 B1 * | 5/2001 | Fisher ................. 60/780 |
| 6,247,316 B1 | 6/2001 | Viteri |
| 6,260,348 B1 | 7/2001 | Sugishita |
| 6,301,895 B1 | 10/2001 | Kallina |
| 6,389,814 B2 | 5/2002 | Viteri |
| 6,422,017 B1 | 7/2002 | Bassily |
| 6,436,337 B1 | 8/2002 | Gross |
| 6,463,741 B1 * | 10/2002 | Frutschi ............... 60/780 |
| 6,523,349 B2 | 2/2003 | Viteri |
| 6,596,220 B2 | 7/2003 | Gross |
| 6,598,398 B2 | 7/2003 | Viteri |
| 6,607,854 B1 | 8/2003 | Rehg |
| 6,619,041 B2 * | 9/2003 | Marin et al. .......... 60/653 |
| 6,622,470 B2 | 9/2003 | Viteri |
| 6,637,183 B2 | 10/2003 | Viteri |
| 6,664,302 B2 | 12/2003 | French |
| 6,808,017 B1 | 10/2004 | Kaellis |
| 6,824,710 B2 | 11/2004 | Viteri |
| 6,868,677 B2 | 3/2005 | Viteri |
| 6,910,335 B2 | 6/2005 | Viteri |
| 6,945,029 B2 | 9/2005 | Viteri |
| 7,021,063 B2 | 4/2006 | Viteri |
| 7,043,920 B2 | 5/2006 | Viteri |
| 2002/0174659 A1 | 11/2002 | Viteri |
| 2004/0011057 A1 | 1/2004 | Huber |
| 2005/0144961 A1 | 7/2005 | Colibaba-Evulet |

FOREIGN PATENT DOCUMENTS

| | | |
|---|---|---|
| DE | 2933932 | 12/1982 |
| DE | 3122338 | 5/1983 |
| DE | 2111602 | 7/1983 |
| DE | 3512947 | 10/1986 |
| EP | 0197555 | 4/1986 |
| EP | 0413199 | 2/1991 |
| EP | 0546501 | 6/1993 |
| EP | 06318464 | 11/1994 |
| EP | 0634562 | 1/1995 |
| EP | 2001015134 | 1/2001 |
| EP | 2001085036 | 3/2001 |
| FR | 350612 | 1/1905 |
| GB | 6394 | 5/1898 |
| GB | 140516 | 3/1920 |
| GB | 271706 | 5/1927 |
| WO | WO 91/02886 | 3/1991 |
| WO | WO 94/10427 | 5/1994 |
| WO | WO 96/07024 | 3/1996 |
| WO | WO 97/44574 | 11/1997 |
| WO | WO 99/22127 | 5/1999 |
| WO | WO 99/63210 | 12/1999 |
| WO | WO 01/75277 | 10/2001 |

OTHER PUBLICATIONS

Sternfeld, H.; A Hydrogen/Oxygen Steam Generator for the Peak-Load Management of Steam Power Plants; unknown date.

Brauser, S. et al.; A Proposed Hydrogen-Oxygen Power Cycle; 1967; Stillwater, Oklahoma.

Reese, R. et al.; A Proposed Hydrogen-Oxygen Fueled Steam Cycle for the Propulsion of Deep Submersibles; 1971; Massachusetts.

Lotker, M.; Hydrogen for the Electric Utilities—Long Range Possibilities; 1974; Hartford, Connecticut.

Lucci, A. et al.; Title Unknown (IECEC '75 Record); 1975; Canoga Park, California.

De Biasi, V.; A Look into Real Payoffs for Combined Cycle Conversions; Gas Turbine World; 1984; pp. 17, 18, 20, 22.

Pak, P. S. et al.; Closed Dual Fluid Gas Turbine Power Plant without Emission of CO2 into the Atmosphere; IFAC/IFORS/IAEE Symposium; 1989; Pergamon Press; Tokyo, Japan.

Yantovskii, E. I.; The Thermodynamics of Fuel-Fired Power Plants without Exhaust Gases; Nov. 1991; Geneva.

Yantovskii, E. I.; Computer Exergonomics of Power Plants without Exhaust Gases; Energy Convers. Mgmt.; 1992; pp. 405-412; vol. 33, No. 5-8; Pergamon Press Ltd.; Great Britain.

Bolland, O. et al.; New Concepts for Natural Gas Fired Power Plants which Simplify the Recovery of Carbon Dioxide; Energy Convers. Mgmt.; 1992; pp. 467-475; vol. 33, No. 5-8; Pergamon Press Ltd.; Great Britain.

Hendriks, C.A. et al.; Carbon Dioxide Recovery Using a Dual Gas Turbine IGCC Plant; Energy Convers. Mgmt.; 1992; pp. 387-396; vol. 33, No. 5-8; Pergamon Press Ltd.; Great Britain.

Mercea, P. V. et al.; Oxygen Separation from Air by a Combined Pressure Swing Adsorption and Continuous Membrane Column Process; Journal of Membrane Science; 1994; pp. 131-144; Cincinnati, Ohio.

Bolland, O. et al.; Comparative Evaluation of Combined Cycles and Gas Turbine Systems with Water Injection, Steam Injection, and Recuperation; Transactions of the ASME; Jan. 1995; pp. 138-140, 142-145; vol. 117.

The NOx Report; Feb. 20, 1995; vol. 1, No. 1.

Alkam, M. K. et al.; Methanol and Hydrogen Oxidation Kinetics in Water at Supercritical States; 1995; The University of Iowa; Iowa City, Iowa.

Rice I. G.; Steam-Injected Gas Turbine Analysis: Steam Rates; Journal of Engineering for Gas Turbines and Power; Apr. 1995; pp. 347-353; vol. 117.

Yantovskii, E. I.; A Zero Emission Combustion Power Plant for Enhanced Oil Recovery; Energy; 1995; vol. 20, No. 8; pp. 823-828.

Kolp, D. A. et al.; Advantages of Air Conditioning and Supercharging an LM6000 Gas Turbine Inlet; Journal of Engineering for Gas Turbines and Power; Jul. 1995; vol. 117.

EPA Proposes Across-the-Board Phase II NOx Limitations; Air Pollution Regulatory Analysis Service; Jan. 19, 1996; Article No. 96-2.

Agazzani, A. et al.; An Assessment of the Performance of Closed Cycles with and without Heat Rejection at Cryogenic Temperatures; International Gas Turbine and Aeroengine Congress & Exhibition; Jun. 10-13, 1996; Birmingham, UK.

Facchini, B. et al.; Semi-Closed Gas Turbine/Combined Cycle with Water Recovery and Extensive Exhaust Gas Recirculation; International Gas Turbine and Aeroengine Congress & Exhibition; Jun. 10-13, 1996; Birmingham, UK.

Nakhamkin, M. et al.; The Cascaded Humidified Advanced Turbine (CHAT); Journal of Engineering for Gas Turbines and Power; Jul. 1996; pp. 565-571; vol. 118.

Rice, I. G.; Split Stream Boilers for High-Temperature/High-Pressure Topping Steam Turbine Combined Cycles; Journal of Engineering for Gas Turbines and Power; Apr. 1997; pp. 385-394; vol. 119.

Ulizar, I. et al.; A Semiclosed-Cycle Gas Turbine with Carbon Dioxide-Argon as Working Fluid; Journal of Engineering for Gas Turbines and Power; Jul. 1997; pp. 612-616; vol. 19.

Wilson, D. G. et al.; The Design of High-Efficiency Turbomachinery and Gas Turbines, Second Edition; 1998; pp. 146-161; Prentice Hall; Upper Saddle River, New Jersey.

Bannister, R. L. et al.; Development of a Hydrogen-Fueled Combustion Turbine Cycle for Power Generation; Transactions of the ASME; Apr. 1998; pp. 276-283; vol. 120.

Mathieu, P. et al.; Zero-Emission MATIANT Cycle; Transactions of the ASME; Jan. 1999; pp. 116-120, vol. 121.

Norwegian Idea for CO2-Free Power Generation; Greenhouse Issues; Mar. 1999.

Aker Maritime; HiOx Gas Fired Power Plants without Atmospheric Emissions; Jun. 1999.

Turkenburg, W. C. et al.; Fossil Fuels in a Sustainable Energy Supply: The Significance of CO2 Removal; A Memorandum at the Request of the Ministry of Economic Affairs the Hague; Jun. 1999; pp. 1-26; Utrecht.

Bilger, R. W.; Zero Release Combustion Technologies and the Oxygen Economy; Fifth Int'l Conference on Technologies and Combustion for a Clean Environment; Jul. 1999; Lisbon, Portugal.

Bilger, R. W.; The Future for Energy from Combustion of Fossil Fuels; Fifth Int'l Conference on Technologies and Combustion for a Clean Environment; Jul. 1999; Lisbon, Portugal.

Herzog, H. et al.; Capturing Greenhouse Gases; Scientific American; Feb. 2000; pp. 72-79.

Anderson, R. E. et al.; A Unique Process for Production of Environmentally Clean Electric Power using Fossil Fuels; 8th International Symposium on Transport Phenomena and Dynamics of Rotating Machinery; Mar. 2000; pp. 1-6; Honolulu, Hawaii.

Chiesa, P. et al.; Natural Gas Fired COmbined Cycles with Low CO2 Emissions; Journal of Engineering for Gas Turbines and Power; Jul. 2000; pp. 429-436; vol. 122.

Hendriks, C.A. et al.; Costs of Carbon Dioxide Removal by Underground Storage; 5th International Conference on Greenhouse Gas Control Technologies (GHGT-5); Aug. 2000; Cairns, Australia.

Hustad, C. W.; Review Over Recent Norwegian Studies Regarding Cost of Low CO2-Emission Power Plant Technology; 5th International Conference on Greenhouse Gas Control Technology; Aug. 2000; Cairns, Australia.

* cited by examiner

ZERO EMISSIONS CLOSED RANKINE CYCLE POWER SYSTEM

CROSS-REFERENCE TO RELATED APPLICATIONS

This application is a divisional of U.S. patent application Ser. No. 11/109,237, filed on Apr. 18, 2005 now abandoned. This application claims benefit under Title 35, United States Code §119(e) of U.S. Provisional Application Nos. 60/562,775, 60/562,792 and 60/562,776 filed on Apr. 16, 2004. This application also incorporates by reference the entire contents of U.S. Pat. Nos. 5,447,555; 5,611,219; 6,598,398; 5,956,937; 6,206,684; 6,637,183; and 6,868,677.

FIELD OF THE INVENTION

The following invention relates to power generation systems which generate power by combustion of a fuel with an oxidizer, and expanding the products of combustion to output power. More particularly, this invention relates to power systems which utilize a majority oxygen oxidizer to combust the fuel, so that little or no pollutants are generated, and which transfer heat externally though a heat exchanger from the products of combustion to a working fluid within a closed loop Rankine cycle.

BACKGROUND OF THE INVENTION

One of the most common fuel combustion power generation systems is the closed Rankine cycle, employed in various forms is steam power plants around the world. In the closed Rankine cycle, a working fluid, most often water, is first pumped to a high pressure. The water is then heated in a boiler, where the water boils into high temperature high pressure steam. This steam is then expanded, typically in multiple stages of turbines. The turbines output power from the system. The steam is discharged from the turbine, and enters a condenser, where it is cooled back into a liquid and delivered back to the pump to repeat the cycle.

Heretofore, fuel combustion based steam power plants have emitted pollution due to the products of combustion of the fuel being too difficult to capture or neutralize entirely, in an economic fashion, and so requiring release. Theorists have proposed that emission of pollutants could be reduced or eliminated by combusting the fuel with oxygen, rather than air (including nitrogen), and then capturing the gaseous combustion products (primarily CO2). Recently one company, Clean Energy Systems of Rancho Cordova, Calif., has demonstrated such a steam power plant.

One common attribute of such proposed and demonstrated power plants is that the working fluid is not externally heated as with a conventional closed Rankine cycle power plant. Rather, the working fluid driving the turbine or other expander has been the actual products of combustion, with possibly water or CO2 added to the products of combustion. In gas turbine power plants operating on the Brayton cycle, such "internal" rather than "external" heating has been effective, partly due to the Brayton cycle power plants typically being configured as open cycles rather than closed cycles.

One consideration in the configuration of a power plant is the minimization of wear on the equipment, so that maintenance can be minimized and useful life of the equipment can be maximized. One source of equipment wear is corrosion. In a conventional steam power plant, the working fluid is typically carefully filtered pure deionized water. Such water exhibits very low corrosive effects on the boiler, turbine, condenser and other parts of the steam power plant. It is desirable to maintain such a low corrosivity advantage when designing or converting a Rankine cycle power plant to operate with zero emissions, as explained above. However, the working fluid of such prior art zero emissions power plants has been a combination of CO2 and water. Such a combination readily forms carbonic acid, having a moderate level of corrosivity with most commonly employed equipment materials. Also, because the heating is "internal," any other pollutants in the products of combustion pass through the turbine, and other equipment in the plant, enhancing the potential for increased maintenance and decreased useful life.

Accordingly, a need exists for a zero emissions power generation system which employs the closed Rankine cycle, and yet maintains the benefits associated with external heating and keeping the working fluid pure water.

SUMMARY OF THE INVENTION

With this invention, a zero emissions fuel combustion power plant is provided which employs the closed Rankine cycle with a working fluid that is externally heated and kept separate from the products of combustion. The power generation system includes a source of oxygen and a source of fuel, both located upstream from a combustor. The combustor receives the oxygen and fuel and combusts them into products of combustion, typically including steam and CO2. These products of combustion are not routed through the steam turbine of the closed Rankine cycle. Rather, they are passed through a high temperature side of a heat exchanger. A low temperature side of the heat exchanger has the working fluid of the closed Rankine cycle passing therethrough. The working fluid is thus kept separate from the products of combustion and is externally heated. This working fluid (typically deionized water) can remain pure, and pass on to the turbine or other expander for power generation, before condensation and pumping back to the heat exchanger. In essence, the heat exchanger takes the place of a boiler in a conventional closed Rankine cycle power generation system.

The products of combustion can be discharged to the atmosphere, if environmental conditions allow, with substantially only steam and CO2 being released. Most preferably, however, the products of combustion are routed to a condenser where the steam condenses to water and the CO2 remains a gas. A gas outlet removes primarily CO2 from the condenser. A liquid outlet removes primarily liquid water from the condenser. The CO2 has now been captured and can be sold as an industrial gas or sequestered away from the atmosphere, such as in a terrestrial formation.

The water can be discharged, or beneficially used outside the power generation system. Most preferably, however, a portion of the water is routed back to the combustor to regulate a temperature of the products of combustion. This water can be preheated with heat from the products of combustion, to boil the water into steam prior to injection into the combustor.

In enhanced embodiments of the invention, a gas turbine can be provided to expand the products of combustion before passing into the heat exchanger, such that additional power is generated, or power is provided to help power an air separation unit to generate oxygen for the system. Also, the system can flexibly be designed to utilize solid fuels, such as coal or biomass, by the addition of a gasifier upstream of the combustor. In one form of the invention, the CO2 is pressurized and delivered into a natural gas fissure. A natural gas supply well tapping into the same fissure can then draw out natural gas (and some CO2) and utilize this natural gas as the fuel for the combustor of this system, with the CO2 remaining in the system or in the fissure throughout.

OBJECTS OF THE INVENTION

Accordingly, a primary object of the present invention is to provide power from combustion with little or no emission of pollutants, including CO2.

Another object of the present invention is to provide a zero emissions power generation system which uses the well known closed Rankine cycle, for reliability and ease of construction and operation.

Another object of the present invention is to provide a zero emissions power generation system which heats a working fluid "externally" without contact with the products of combustion.

Another object of the present invention is to provide a zero emissions power generation system which can be used to retrofit an existing steam power plant with minimal modification of the power plant required.

These and other objects will be made more evident by a careful reading of the preferred embodiments described below, as well as the related drawings and the claims.

DESCRIPTION OF THE PREFERRED EMBODIMENTS

Referring to the drawings, wherein like reference numerals represent like parts throughout the various drawing figures, reference numerals 10, 210 and 410 (FIGS. 1, 2 and 3, respectively) are directed to variations on a zero emissions power generation system according to this invention. The fuel is combusted with a majority oxygen oxidizer, so that products of combustion, typically steam and CO2, result in volumes that can be readily separated and handled without atmospheric release.

Figure 1:
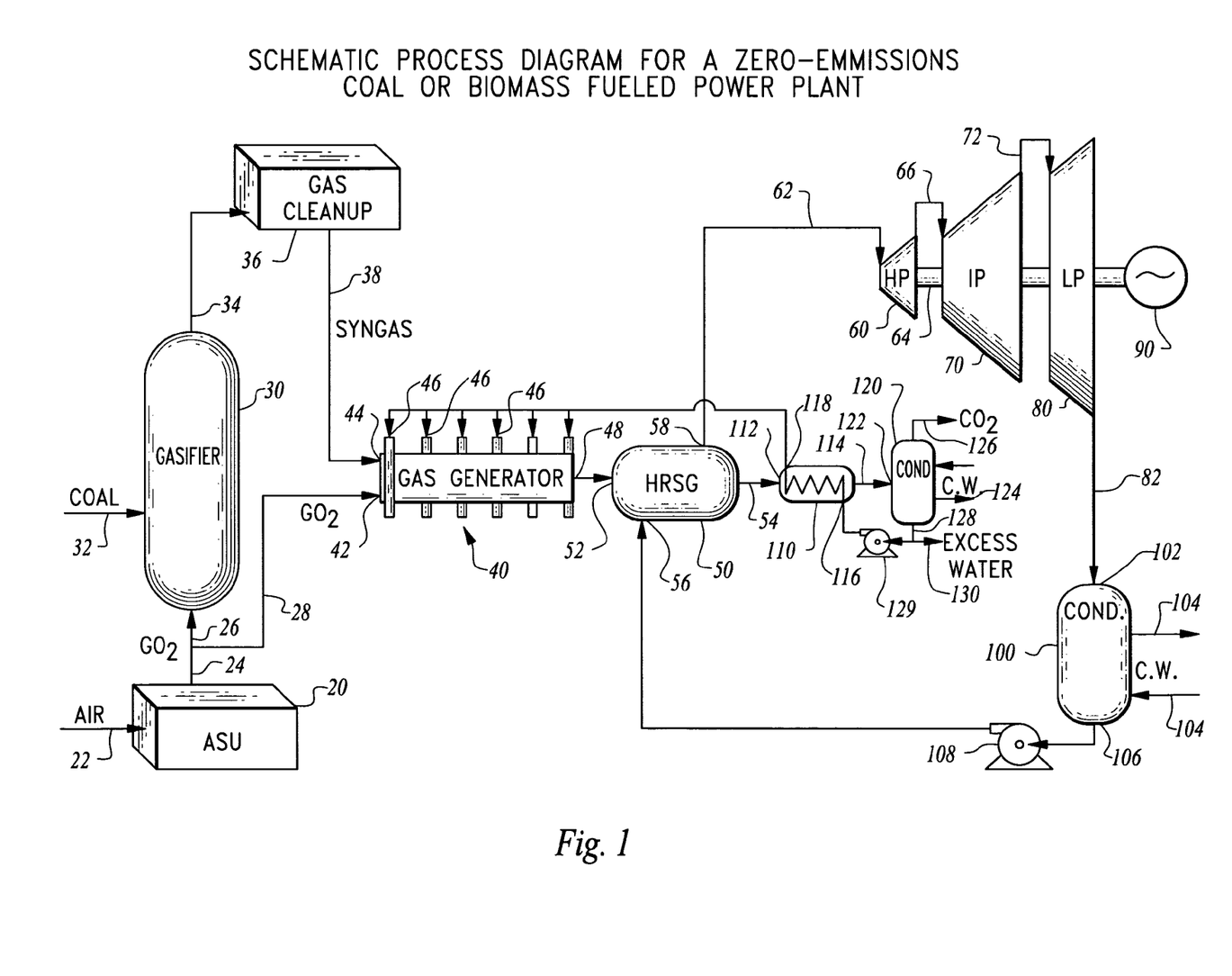
FIG. 1 is a schematic illustrating the flow of reactants and products flowing through the system and the various components which function together to form one system according to a first illustrated embodiment of this invention, with the system particularly configured in the form of a zero emissions coal or biomass fueled power plant with external heating of a working fluid contained within a closed Rankine cycle.

In essence, and with particular reference to FIG. 1, a basic form of this invention is described. While FIG. 1 particularly discloses a coal fueled power plant, a most basic form of this invention would operate on a fuel that is ready to combust without requiring gasification. Thus in such a most basic system the gasifier 30 and gas cleanup 36 of FIG. 1 would be replaced with a source of fuel, such as gaseous methane ("natural gas"). Also, a most basic form of this invention could receive oxygen from a source other than the air separation unit (ASU) 20.

In such a most basic form of the invention, the fuel and oxygen are entered into a combustor, such as the gas generator 40, where they are combusted into products of combustion (typically steam and CO2 where the fuel is natural gas). Preferably, water is also entered into the combustor, such as in the form of at least one of the water inlets 46. A mixture of steam and CO2 is discharged from the combustor, and passes into a heat exchanger. The heat exchanger 50 (also called a "heat recovery steam generator" or "HRSG") transfers heat from the products of combustion to a working fluid (typically water) within a closed loop Rankine cycle. The products of combustion can then be further handled in various different ways, according to various alternative embodiments of this invention. The heat exchanger 50 causes the working fluid to be heated into a gaseous phase. The working fluid then passes through at least one expander, and preferably a series of turbines 60, 70, 80. The expander(s) can generate power, such as by driving a generator 90. The working fluid is then condensed within a condenser 100 and returned to the heat exchanger by way of a pump 108 to repeat the Rankine cycle.

More specifically, and with particular reference to FIG. 1, details of a first specific embodiment of the power generation system of this invention are described. This embodiment is unique from the other embodiments in that it is customized to utilize coal, biomass or other carbon containing fuel which is first gasified into a syngas before combustion occurs.

One basic principle on which this power generation system is based, is that the fuel is combusted with oxygen, or at a minimum, an oxygen enriched oxidizer having a greater amount of oxygen than an amount of oxygen present in the air. With oxygen as the oxidizer, NOx formation is precluded. The power generation system 10 is depicted in FIG. 1 in schematic form. An air separation unit 20 is provided to separate oxygen from the air. Air enters the air separation unit 20 along air inlet 22. Oxygen exits the air separation unit 20 through oxygen outlet 24.

The air separation unit 20 can be any suitable device for separation of oxygen from the air. For instance, the air separation unit 20 could be based on air liquefaction technology or based on membrane separation technology. Particular details of such air separation technology is described in U.S. Pat. No. 6,598,398, incorporated herein by reference.

The oxygen outlet 24 preferably discharges gaseous oxygen, but could optionally discharge liquid oxygen. For this coal fired power generation system, the oxygen outlet 24 feeds two separate lines including a gasifier line 26 and a gas generator line 28. The gas fire line 26 leads to a gasifier 30. The gasifier 30 is provided to convert coal into syngas (i.e. carbon monoxide and hydrogen, or other syngas compositions). The gasifier 30 utilizes known gasifier technology to convert the coal into the syngas. The gasifier thus includes a coal inlet 32 and a syngas outlet 34. If required, the gasifier 30 can additionally include a water inlet or water can enter the gasifier along with the coal. One source of such water would be the excess water 130 which would otherwise be discharged from the power generation system 10.

The syngas outlet 34 of the gasifier 30 leads to a gas cleanup station 36 where any impurities contained within the coal (i.e. sulfur) would be removed from the syngas. Clean syngas would then be discharged through the clean syngas line 38 to be passed on to the gas generator 40.

The gas generator 40 has an oxygen inlet 42 for the oxygen from the air separation unit 20 and a syngas inlet 44 for the syngas from gasifier 30. The gas generator 40 also preferably includes water inlets 46. The oxygen and syngas are combusted together within the gas generator 40 to produce high temperature high pressure combustion products including steam and carbon dioxide. Water from the water inlets 46 regulates the temperature of this combustion reaction and adds additional water/steam to the combustion products exiting the gas generator 40 at the discharge 48. Particular details of the gas generator 40 are described further in U.S. Pat. Nos. 5,956,937 and 6,206,6874, each incorporated herein by reference.

The combustion products, including steam and carbon dioxide, exit the gas generator 40 through the discharge 48 and then enter the heat recovery steam generator 50 at the combustion products inlet 52. The heat recovery steam generator 50 is a two path heat exchanger to transfer heat from the hot combustion products to water/steam in a separate line passing through the heat recovery steam generator 50. While the combustion products could be directly passed through a turbine or other expander for power generation, in the preferred embodiment depicted herein the water/steam that drives turbines in this power generation system 10 is isolated within the heat recovery steam generator 50, so that purified water is recirculated through the turbines 60, 70, 80 or other expander. The benefit of this particular embodiment is that prior art turbines and prior art condensers and prior art feed water pumps can be utilized for the power generation portion of this system 10. This system 10 thus simplifies the construction of this power plant and still exhibits zero emissions.

The heat recovery steam generator 50 includes a combustion products outlet 54 in communication with the combustion products inlet 52. The heat recovery steam generator 50 also includes a water inlet 56 coupled to a steam outlet 58. A water/steam pathway between the water inlet 56 and the steam outlet 58 is in heat transfer relationship with a combustion products pathway between the combustion products inlet 52 and the combustion products outlet 54. In many ways the heat recovery steam generator 50 can be analogized to a boiler within a typical prior art steam power plant. Further portions of this power generation system 10 downstream from the combustion products outlet 54 are described below.

The water entering the water inlet 56 of the heat recovery steam generator 50 is turned into steam before it reaches the steam outlet 58 of the heat recovery steam generator 50. This steam is then passed to the steam feed line 62 of the high pressure turbine 60. The high pressure turbine 60 provides a preferred form of expander for the steam generated within the heat recovery steam generator 50. The high pressure turbine 60 is coupled to a shaft 64 which is preferably also coupled to an intermediate pressure turbine 70, a low pressure turbine 80 and an electric generator 90.

The steam in the steam feed line 62 passes through the high pressure turbine 60, then through the high pressure discharge 66 to the intermediate pressure turbine 70. The steam then passes along the intermediate pressure discharge 72 to the low pressure turbine 80 and on to the low pressure discharge 82. While three turbines 60, 70, 80 are shown, alternatively a single turbine, or other numbers of turbines could be provided. Also, other types of expanders, such as piston expanders could be employed to drive the generator 90.

The multiple turbines 60, 70, 80 can all be connected to a common shaft to drive the generator or be coupled together through gears to rotate at different speeds, or not be coupled together mechanically, but rather drive their own separate generators, or drive other equipment (i.e. feed water pumps) within the power generation system 10, or drive other equipment.

The steam exiting the low pressure turbine 80 through the low pressure discharge 82 is passed to the condenser 100. The condenser 100 converts the low pressure and low temperature steam from a gaseous phase to a liquid phase. The condenser 100 would be similar to any typical prior art condenser for a steam power plant. For instance, a low pressure steam inlet 102 would direct the steam into the condenser 100. A cooling water circuit 104 would pass through the condenser 100 to cool the steam therein. A water outlet 106 would be provided at the bottom of the condenser 100 for pure liquid water working fluid to be discharged from the condenser 100. A feed water pump 108 is provided downstream from the water outlet 106 to repressurize the water before the water passes back to the water inlet 56 of the heat recovery steam generator 50 and on to the turbines 60, 70, 80 to form a closed loop Rankine cycle steam power generation loop.

While this steam power generation loop including the heat recovery steam generator 50, turbines 60, 70, 80, condenser 100 and pump 108 is preferably in the form depicted herein, any Rankine cycle steam power generation system (or other working fluid Rankine cycle) could alternatively be utilized. Particularly, any suitable Rankine power generation system could initially be selected and then the boiler from that system replaced with the heat recovery steam generator 50 of the power generation system 10 of this invention. The Rankine cycle power generation system would then operate according to its design.

With further reference to FIG. 1, particular details of the handling of the combustion products after they are discharged from the combustion products outlet 54 of the heat recovery steam generator 50 are described in detail. While these combustion products, including steam and carbon dioxide, could be exhausted directly to the atmosphere, multiple benefits are provided by further processing these combustion products. Particularly, the carbon dioxide within the combustion products can be separated from the steam within the combustion products. The steam can then be recirculated to the gas generator or otherwise be beneficially utilized. The carbon dioxide which has then been isolated can similarly be utilized in a productive fashion, such as selling the carbon dioxide as an industrial gas or utilizing the carbon dioxide for enhanced oil recovery, enhanced gas recovery, or merely for sequestration in a location other than the atmosphere.

In the preferred embodiment of this power system 10, the combustion products exiting the heat recovery steam generator 54 are passed to a feed water heater 110 before being delivered to a separator 120. The feed water heater 110 includes a combustion products entrance 112 which receives the combustion products from the heat recovery steam generator 50. A combustion products exit 114 removes the combustion products out of the feed water heater 110. The feed water heater 110 also includes a water entrance 116 and a water exit 118.

Water passing between the water entrance 116 and water exit 118 would be heated by excess heat within the combustion products exiting the heat recovery steam generator 50. This heated water can then beneficially be delivered to the gas generator through the water inlet 46. The combustion products leaving the feed water heater 110 through the combustion products exit 114 are further cooled by the heater 110, preferably to a temperature near where the water within the combustion products is ready to condense into a liquid.

The separator 120 includes a combustion products entry 122 which receives the combustion products from the feed water heater 110. A cooling water circuit 124 provides cooling within the separator 120 in a fashion similar to that of a typical condenser within a steam power plant. While the coolant is preferably water, other coolants could be utilized for the separator 120 (as well as for the condenser 100).

The separator 120 includes a carbon dioxide discharge 126 which removes gaseous portions of the combustion products from the separator 120. A water discharge 128 removes liquid portions of the combustion products, including substantially entirely water. This water exiting the separator 120 of the water discharge 128 is beneficially fed to the feed water heater 110 at the water entrance 116 for recirculation to the gas generator 40. A feed water pump 126 would typically be provided to repressurize the water exiting the separator 120 if necessary. An excess water outlet 130 is also located adjacent the water discharge 128.

This system does not particularly show any expander for the combustion products between the gas generator 40 and the feed water pump 129. At a minimum, pressure losses within the pipes between the gas generator 40 and the feed water pump 129 could be made up by the feed water pump 129 itself to maintain flow rates desired for the system. If the feed water heater 110 and/or separator 120 would benefit from handling lower pressure combustion products passing therethrough, some form of expansion valve could be provided. Such expansion would also decrease a temperature of the combustion products, and so would beneficially be located between the feed water heater 110 and the separator 120. However, such a valve could be conceivably located anywhere between the gas generator 40 and the feed water pump 129. Rather than merely providing an expansion valve, a turbine or other expander could be provided coupled to a generator or otherwise delivering useful power. As a primary purpose of this invention is to demonstrate the feasibility of generating electric power from combustion of coal in a zero emissions fashion, the inclusion of any such additional turbines would be optional.

While the power generation system 10 is particularly shown with the fuel being coal, other carbon containing fuel sources could similarly be utilized. For instance, biomass fuel sources could be utilized, petcoke, landfill gas, and various different carbon containing waste streams could be utilized. If a more pure fuel such as natural gas or hydrogen were to be utilized, the gasifier 30 and gas cleanup 36 portions of this system 10 would be eliminated. Also, in the case of hydrogen, no carbon dioxide would be generated within the system.

Figure 2:
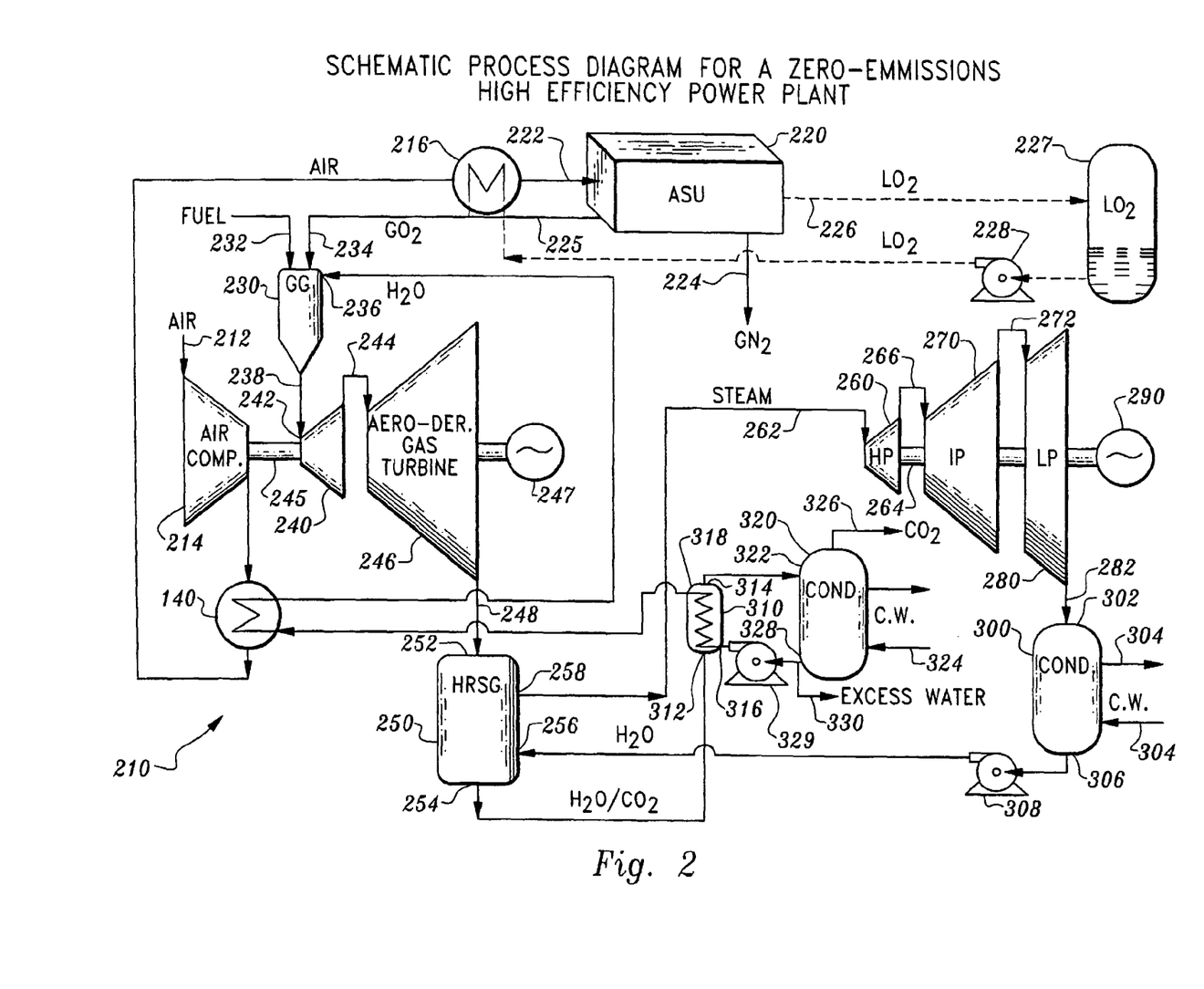
FIG. 2 is a schematic illustrating the flow of reactants and products flowing through the system and the various components which function together to form one system according to a second illustrated embodiment of this invention, with the system particularly configured as a zero emissions high efficiency power plant with external heating of a working fluid contained within a closed Rankine cycle and a gas turbine for expanding the products of combustion in a second at least partially open Rankine cycle utilizing internal heating.

With particular reference to FIG. 2, details of the power generation system 210 of this invention are described. This embodiment is unique from the other disclosed embodiments in that it burns some form of hydrocarbon fuel, including optionally syngas, and utilizes both a gas turbine and a steam turbine with the working fluids kept separate, to generate power while exhibiting zero emissions.

One basic principle on which this power generation system 210 is based, is that the fuel is combusted with oxygen, or at a minimum, an oxygen enriched oxidizer having a greater amount of oxygen than an amount of oxygen present in the air. With oxygen as the oxidizer, NOx formation is precluded.

Air initially enters the system 210 through an air inlet 212. The air inlet 212 leads to an air compressor 214 which is driven by a high pressure gas turbine 240 described in detail below. The air compressor 214 discharges the compressed air at a high temperature and high pressure. Heat of compression is preferably removed first through a second feed water heater 2140, and second through a precooler 216, where the air is cooled by giving heat to liquid oxygen from a liquid oxygen reservoir 227 described in detail below. Such cooling of the air before entry into the air separation unit 220 is preferred, especially when the air separation unit 220 utilizes liquefaction technology to separate oxygen from other constituents within the air. The air separation unit 220 can be any suitable device for separation of oxygen from the air. For instance, the air separation unit 220 could be based on air liquefaction technology or based on membrane separation technology. Particular details of such air separation technology is described in U.S. Pat. No. 6,598,398, incorporated herein by reference.

The air separation unit 220 includes an air entrance 222 receiving the air which originated at the air inlet 212. The air separation unit 220 also includes a nitrogen outlet 224 for gaseous nitrogen removed from the oxygen within the air by the air separation unit. If any residual energy exists within this stream of nitrogen at the nitrogen outlet 224, an appropriate expander can be utilized to generate additional power off of the nitrogen exiting the air separation unit 220 through the nitrogen outlet 224. A gaseous oxygen outlet 225 is preferably also provided for discharge of oxygen, or an oxygen enriched air stream from the air separation unit 220.

Alternatively, or in addition to the gaseous oxygen outlet 225, a liquid oxygen outlet 226 can also be provided for removal of liquid oxygen from the air separation unit 220. Such a liquid oxygen outlet 226 would typically lead to a liquid oxygen reservoir 227 where oxygen could be conveniently stored, such as for start up of the power generation system 210, or to allow the system 210 to be operated either with the air separation unit 220, or operated off of liquid oxygen supplied in batches, such as by tanker truck or tanker rail car delivery. A pump 228 is provided between the liquid oxygen reservoir 227 and the gas generator 230 where the oxygen is utilized. Preferably, the liquid oxygen exiting liquid oxygen reservoir 227 is passed through the precooler 216 to precool the air before it enters the air separation unit 220 within the precooler 216.

The gas generator 230 has an oxygen inlet 234 for the oxygen from the air separation unit 220 or the liquid oxygen reservoir 227, and the fuel inlet 232 for the fuel. The gas generator 230 also preferably includes at least one water inlet 236. The oxygen and fuel are combusted together within the gas generator 230 to produce high temperature high pressure combustion products including steam and carbon dioxide. Water from the water inlet 236 regulates the temperature of this combustion reaction and adds additional water/steam to the combustion products exiting the gas generator 230 at the discharge 238. Particular details of one form of the gas generator 230 are described further in U.S. Pat. Nos. 5,956,937 and 6,206,684, each incorporated herein by reference.

The combustion products including steam and carbon dioxide exit the gas generator 230 through the discharge 238 and then are passed to one or more gas turbines 240, 246 for expansion of the high temperature high pressure combustion products including steam and carbon dioxide. Particularly, a high pressure gas turbine 240 is provided downstream from the discharge 238 of the gas generator 230. An inlet 242 receives the combustion products into the high pressure gas turbine 240. An outlet 244 discharges the combustion products out of the high pressure gas turbine 240. A shaft 245 preferably couples the high pressure gas turbine 240 to the air compressor 214. With this embodiment, the high pressure gas turbine 240 provides mechanical power to directly drive the air compressor 214. Alternatively, the high pressure gas turbine 240 could be coupled to an electric power generator and the air compressor 214 could be separately powered.

The outlet 244 transports the combustion products including steam and carbon dioxide to a low pressure gas turbine 246 for further expanding of the steam and carbon dioxide combustion products. This low pressure gas turbine 246 is preferably a commercially available aeroderivative gas turbine with the inlet pressure, outlet pressure, inlet temperature and outlet temperature appropriately matched for such a previously existing aeroderivative gas turbine. The low pressure turbine 246 is preferably coupled to a gas turbine generator 247 for production of additional power. The combustion products are discharged from the low pressure gas turbine 246 through the outlet 248.

The low pressure gas turbine 246 could additionally be coupled by a shaft to the high pressure gas turbine 240 and/or to the air compressor 214. While a high pressure gas turbine 240 and low pressure gas turbine 246 are shown, more than two or less than two such turbines could be utilized to expand the combustion products exiting the gas generator 230.

Preferably, the combustion products at the outlet 248 still have sufficient temperature so that waste heat is available for producing steam within the heat recovery steam generator 250. The outlet 248 is thus coupled to the combustion products inlet 252 of the heat recovery steam generator 250. The heat recovery steam generator 250 is a two path heat exchanger to transfer heat from the hot combustion products to water/steam in a separate line passing through the heat recovery steam generator 250. While the combustion products could be directly passed through a turbine or other expander for power generation, in the preferred embodiment depicted herein the water/steam that drives turbines in this power generation system 210 is isolated within the heat recovery steam generator 250, so that purified water is recirculated through the turbine 260, 270, 280 or other expander. The benefit of this particular embodiment is that prior art turbines and prior art condensers and prior art feed water pumps can be utilized for the power generation portion of this system 210. This system 210 thus simplifies the construction of this power plant and still exhibits zero emissions.

The heat recovery steam generator 250 includes a combustion products outlet 254 in communication with the combustion products inlet 252. The heat recovery steam generator 250 also includes a water inlet 256 coupled to a steam outlet 258. A water/steam pathway between the water inlet 256 and the steam outlet 258 is in heat transfer relationship with a combustion products pathway between the combustion products inlet 252 and the combustion products outlet 254. In many ways, the heat recovery steam generator 250 can be analogized to a boiler within a typical prior art steam power plant. Further portions of this power generation system 210 downstream from the combustion products outlet 254 are described below.

The water entering the water inlet 256 of the heat recovery steam generator 250 is turned into steam before it reaches the steam outlet 258 of the heat recovery steam generator 250. This steam is then passed to the steam feed line 262 of the high pressure turbine 260. The high pressure turbine 260 provides a preferred form of expander for the steam generated within the heat recovery steam generator 250. The high pressure turbine 260 is coupled to a shaft 264 which is preferably also coupled to an intermediate pressure turbine 270, a low pressure turbine 280 and an electric generator 290.

The steam in the steam feed line 262 passes through the high pressure turbine 260, then through the high pressure discharge 266 to the intermediate pressure turbine 270. The steam then passes along the intermediate pressure discharge 272 to the low pressure turbine 280 and on to the low pressure discharge 282. While three turbines 260, 270, 280 are shown, alternatively a single turbine, or other numbers of turbines could be provided. Also, other types of expanders, such as piston expanders could be employed to drive the generator 290.

The multiple turbines 260, 270, 280 can all be connected to a common shaft to drive the generator or be coupled together through gears to rotate at different speeds, or not be coupled together mechanically, but rather drive their own separate generators, or drive other equipment (i.e. feed water pumps) within the power generation system 210, or drive other equipment.

The steam exiting the low pressure turbine 280 through the low pressure discharge 282 is passed to the condenser 300. The condenser 300 converts the low pressure and low temperature steam from a gaseous phase to a liquid phase. The condenser 300 would be similar to any typical prior art condenser for a steam power plant. For instance, a low pressure steam inlet 302 would direct the steam into the condenser 300. A cooling water circuit 304 would pass through the condenser 300 to cool the steam therein. A water outlet 306 would be provided at the bottom of the condenser 300 for pure liquid water working fluid to be discharged from the condenser 300. A feed water pump 308 is provided downstream from the water outlet 306 to repressurize the water before the water passes back to the water inlet 256 of the heat recovery steam generator 250 and on to the turbines 260, 270, 280 to form a closed loop Rankine cycle steam power generation loop.

While this steam power generation loop including the heat recovery steam generator 250, turbines 260, 270, 280, condenser 300 and pump 308 is preferably in the form depicted herein, any Rankine cycle steam power generation system (or other working fluid Rankine cycle) could alternatively be utilized. Particularly, any suitable Rankine power generation system could initially be selected and then the boiler from that system replaced with the heat recovery steam generator 250 of the power generation system 210 of this invention. The Rankine cycle power generation system would then operate according to its design.

With further reference to FIG. 2, particular details of the handling of the combustion products after they are discharged from the combustion products outlet 254 of the heat recovery steam generator 250 are described in detail. While these combustion products, including steam and carbon dioxide, could be exhausted directly to the atmosphere, multiple benefits are provided by further processing these combustion products. Particularly, the carbon dioxide within the combustion products can be separated from the steam within the combustion products. The steam can then be recirculated to the gas generator or otherwise be beneficially utilized. The carbon dioxide which has then been isolated can similarly be utilized in a productive fashion, such as selling the carbon dioxide as an industrial gas or utilizing the carbon dioxide for enhanced oil recovery, enhanced gas recovery, or merely for sequestration in a location other than the atmosphere.

In the preferred embodiment of this power system 210, the combustion products exiting the heat recovery steam generator 254 are passed to a feed water heater 310 before being delivered to a separator 320. The feed water heater 310 includes a combustion products entrance 312 which receives the combustion products from the heat recovery steam generator 250. A combustion products exit 314 removes the combustion products out of the feed water heater 310. The feed water heater 310 also includes a water entrance 316 and a water exit 318.

Water passing between the water entrance 316 and water exit 318 would be heated by excess heat within the combustion products exiting the heat recovery steam generator 250.

This heated water can then beneficially be delivered to the gas generator through the water inlet 246. The combustion products leaving the feed water heater 310 through the combustion products exit 314 are further cooled by the heater 310, preferably to a temperature near where the water within the combustion products is ready to condense into a liquid.

The separator 320 includes a combustion products entry 322 which receives the combustion products from the feed water heater 310. A cooling water circuit 324 provides cooling within the separator 320 in a fashion similar to that of a typical condenser within a steam power plant. While the coolant is preferably water, other coolants could be utilized for the separator 320 (as well as for the condenser 300).

The separator 320 includes a carbon dioxide discharge 326 which removes gaseous portions of the combustion products from the separator 320. A water discharge 328 removes liquid portions of the combustion products, including substantially entirely water. This water exiting the separator 320 of the water discharge 328 is beneficially fed to the feed water heater 310 at the water entrance 316 for recirculation to the gas generator 230. A feed water pump 326 would typically be provided to repressurize the water exiting the separator 320 if necessary. An excess water outlet 330 is also located adjacent the water discharge 328.

While the water could be recirculated directly to the gas generator 230, most preferably the water is first routed to a second feed water heater 340. The water can thus be additionally preheated with heat of compression in the air discharged from the air compressor 214, before the preheated water is passed on to the water inlet 236 of the gas generator 230.

Figure 3:
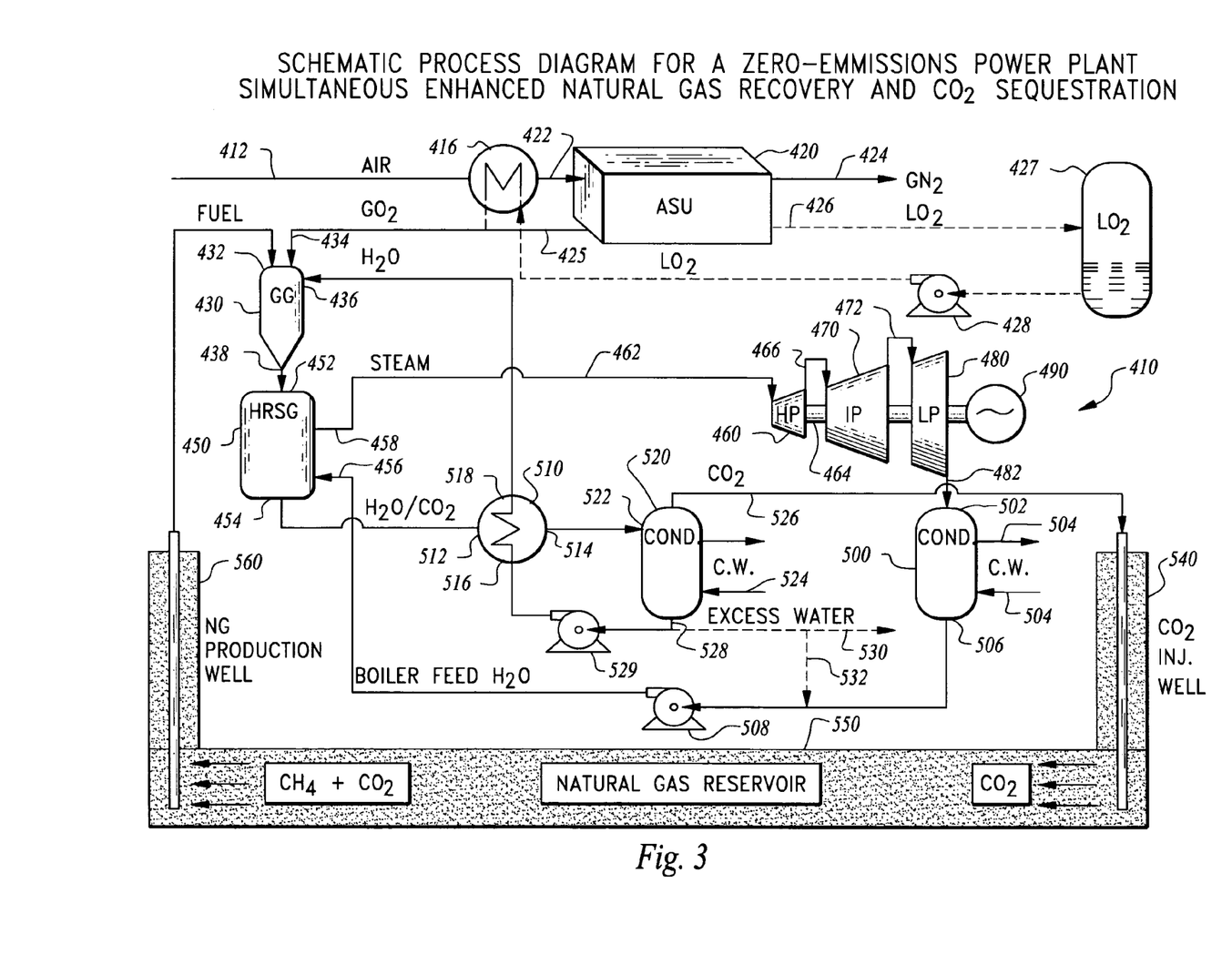
FIG. 3 is a schematic illustrating the flow of reactants and products flowing through the system and the various components which function together to form one system according to a third illustrated embodiment of this invention, with the system particularly configured as a zero emissions power plant with CO2 in the products of combustion used for enhanced natural gas recovery and sequestered away from the atmosphere.

With particular reference to FIG. 3, details of the power generation system 410 of this invention are described. This embodiment is unique from the other embodiments of this invention in that it contemplates utilizing excess CO2 to enhance recovery of natural gas, and then potentially using the natural gas recovered to power the system. As with the previous embodiments, a basic principle on which this power generation system 410 is based, is that the fuel is combusted with oxygen, or at a minimum, an oxygen enriched oxidizer having a greater amount of oxygen than an amount of oxygen present in the air. With oxygen as the oxidizer, NOx formation is precluded.

Air initially enters the system 410 through an air inlet 412. A precooler 416 is optionally provided where the air is cooled by giving heat to liquid oxygen from a liquid oxygen reservoir 427 described in detail below. Such cooling of the air before entry into the air separation unit 420 is preferred, especially when the air separation unit 420 utilizes liquefaction technology to separate oxygen from other constituents within the air. The air separation unit 420 can be any suitable device for separation of oxygen from the air. For instance, the air separation unit 420 could be based on air liquefaction technology or based on membrane separation technology. Particularly details of such air separation technology is described in U.S. Pat. No. 6,598,398, incorporated herein by reference.

The air separation unit 420 includes an air entrance 422 receiving the air which originated at the air inlet 412. The air separation unit 420 also includes a nitrogen outlet 424 for gaseous nitrogen removed from the oxygen within the air by the air separation unit. If any residual energy exists within this stream of nitrogen at the nitrogen outlet 424, an appropriate expander can be utilized to generate additional power off of the nitrogen exiting the air separation unit 420 through the nitrogen outlet 424. A gaseous oxygen outlet 425 is preferably also provided for discharge of oxygen, or an oxygen enriched air stream from the air separation unit.

Alternatively, or in addition to the gaseous oxygen outlet 425, a liquid oxygen outlet 426 can also be provided for removal of liquid oxygen from the air separation unit 420. Such a liquid oxygen outlet 426 would typically lead to a liquid oxygen reservoir 427 where oxygen could be conveniently stored, such as for start up of the power generation system 410, or to allow the system to be operated either with the air separation unit 420, or operated off of liquid oxygen supplied, such as by tanker truck or tanker rail car delivery. A pump 428 is provided between the liquid oxygen reservoir 427 and the gas generator 430 where the oxygen is utilized. Preferably, the liquid oxygen exiting liquid oxygen reservoir 427 is passed through the precooler 416 to precool the air before it enters the air separation unit 420.

The gas generator 430 has an oxygen inlet 434 for the oxygen from the air separation unit 420 or the liquid oxygen reservoir 427, and a fuel inlet 432 for the fuel. The gas generator 430 also preferably includes at least one water inlet 436. The oxygen and fuel are combusted together within the gas generator 430 to produce high temperature high pressure combustion products including steam and carbon dioxide. Water from the water inlet 436 regulates the temperature of this combustion reaction and adds additional water/steam to the combustion products exiting the gas generator 430 at the discharge 438. Particular details of the gas generator 430 are described further in U.S. Pat. Nos. 5,956,937 and 6,206,684, each incorporated herein by reference.

The combustion products including steam and carbon dioxide exit the gas generator 430 through the discharge 438. Optionally, the products of combustion can then be passed to one or more gas turbines for expansion of the high temperature high pressure combustion products including steam and carbon dioxide.

The combustion products have sufficient temperature so that heat is available for producing steam within the heat recovery steam generator 450. The discharge 438 is thus upstream from a combustion products inlet 452 of the heat recovery steam generator 450.

The heat recovery steam generator 450 is a two path heat exchanger to transfer heat from the hot combustion products to water/steam in a separate line passing through the heat recovery steam generator 450. While the combustion products could be directly passed through a turbine or other expander for power generation, in the preferred embodiment depicted herein the water/steam that drives turbines in this power generation system 410 is isolated within the heat recovery steam generator 450, so that purified water is recirculated through the turbine 460, 470, 480 or other expander. The benefit of this particular embodiment is that prior art turbines and prior art condensers and prior art feed water pumps can be utilized for the power generation portion of this system 410. This system 410 thus simplifies the construction of this power plant and still exhibits zero emissions.

The heat recovery steam generator 450 includes a combustion products outlet 454 in communication with the combustion products inlet 452. The heat recovery steam generator 450 also includes a water inlet 456 coupled to a steam outlet 458. A water/steam pathway between the water inlet 456 and the steam outlet 458 is in heat transfer relationship with a combustion products pathway between the combustion products inlet 452 and the combustion products outlet 454. In many ways, the heat recovery steam generator 450 can be analogized to a boiler within a typical prior art steam power plant. Further portions of this power generation system 410 downstream from the combustion products outlet 454 are described below.

The water entering the water inlet 456 of the heat recovery steam generator 450 is turned into steam before it reaches the steam outlet 458 of the heat recovery steam generator 450. This steam is then passed to the steam feed line 462 of the high pressure turbine 460. The high pressure turbine 460 provides a preferred form of expander for the steam generated within the heat recovery steam generator 450. The high pressure turbine 460 is coupled to a shaft 464 which is preferably also coupled to an intermediate pressure turbine 470, a low pressure turbine 480 and an electric generator 490.

The steam in the steam feed line 462 passes through the high pressure turbine 460, then through the high pressure discharge 466 to the intermediate pressure turbine 470. The steam then passes along the intermediate pressure discharge 472 to the low pressure turbine 480 and on to the low pressure discharge 482. While three turbines 460, 470, 480 are shown, alternatively a single turbine, or other numbers of turbines could be provided. Also, other types of expanders, such as piston expanders could be employed to drive the generator 490.

The multiple turbines 460, 470, 480 can all be connected to a common shaft to drive the generator or be coupled together through gears to rotate at different speeds, or not be coupled together mechanically, but rather drive their own separate generators, or drive other equipment (i.e. feed water pumps) within the power generation system 410, or drive other equipment.

The steam exiting the low pressure turbine 480 through the low pressure discharge 482 is passed to the condenser 500. The condenser 500 converts the low pressure and low temperature steam from a gaseous phase to a liquid phase. The condenser 500 would be similar to any typical prior art condenser for a steam power plant. For instance, a low pressure steam inlet 502 would direct the steam into the condenser 500. A cooling water circuit 504 would pass through the condenser 500 to cool the steam therein. A water outlet 506 would be provided at the bottom of the condenser 500 for pure liquid water working fluid to be discharged from the condenser 500. A feed water pump 508 is provided downstream from the water outlet 506 to repressurize the water before the water passes back to the water inlet 456 of the heat recovery steam generator 450 and on to the turbines 460, 470, 480 to form a closed loop Rankine cycle steam power generation loop.

While this steam power generation loop including the heat recovery steam generator 450, turbines 460, 470, 480, condenser 500 and pump 508 is preferably in the form depicted herein, any Rankine cycle steam power generation system (or other working fluid Rankine cycle) could alternatively be utilized. Particularly, any suitable Rankine power generation system could initially be selected and then the boiler from that system replaced with the heat recovery steam generator 450 of the power generation system 410 of this invention. The Rankine cycle power generation system would then operate according to its design.

With further reference to FIG. 3, particular details of the handling of the combustion products after they are discharged from the combustion products outlet 454 of the heat recovery steam generator 450 are described in detail. While these combustion products, including steam and carbon dioxide, could be exhausted directly to the atmosphere, multiple benefits are provided by further processing these combustion products. Particularly, the carbon dioxide within the combustion products can be separated from the steam within the combustion products. The steam can then be recirculated to the gas generator 430 or otherwise be beneficially utilized. The carbon dioxide which has then been isolated can similarly be utilized in a productive fashion, such as selling the carbon dioxide as an industrial gas or utilizing the carbon dioxide for enhanced oil recovery, enhanced gas recovery, or merely for sequestration in a location other than the atmosphere.

In the preferred embodiment of this power system 410, the combustion products exiting the heat recovery steam generator 454 are passed to a feed water heater 510 before being delivered to a separator 520. The feed water heater 510 includes a combustion products entrance 512 which receives the combustion products from the heat recovery steam generator 450. A combustion products exit 514 removes the combustion products out of the feed water heater 510. The feed water heater 510 also includes a water entrance 516 and a water exit 518.

Water passing between the water entrance 516 and water exit 518 would be heated by excess heat within the combustion products exiting the heat recovery steam generator 450. This heated water can then beneficially be delivered to the gas generator 430 through the water inlet 436. The combustion products leaving the feed water heater 510 through the combustion products exit 514 are further cooled by the heater 510, preferably to a temperature near where the water within the combustion products is ready to condense into a liquid.

The separator 520 includes a combustion products entry 522 which receives the combustion products from the feed water heater 510. A cooling water circuit 524 provides cooling within the separator 520 in a fashion similar to that of a typical condenser within a steam power plant. While the coolant is preferably water, other coolants could be utilized for the separator 520 (as well as for the condenser 500).

The separator 520 includes a carbon dioxide discharge 526 which removes gaseous portions of the combustion products from the separator 520. A water discharge 528 removes liquid portions of the combustion products, including substantially entirely water. This water exiting the separator 520 of the water discharge 528 is beneficially fed to the feed water heater 510 at the water entrance 516 for recirculation to the gas generator 430. A feed water pump 529 would typically be provided to repressurize the water exiting the separator 520 if necessary. An excess water outlet 530 is also located adjacent the water discharge 528. The excess water can also feed a make-up waterline 532 for the closed loop Rankine cycle.

With the system 410 of this invention the carbon dioxide discharged from the separator 520 along CO2 discharge 526 is beneficially utilized to enhance recovery of gas from a natural gas reservoir 550. In a most preferred form of this invention, this extra natural gas produced is then used within the gas generator 430 as the fuel combusted therein, so that the discharged carbon dioxide and the inputted fuel into the system form their own closed loop.

Specifically, the CO2 from the CO2 discharge 526 is directed to a CO2 injection well 540. The CO2 would typically require pressurization before injection into the CO2 injection well 540. Such pressurization would typically involve multiple stages of compression and intercooling, with the intercooling stages typically drying the CO2 and removing any water vapor which might have left the separator 520 along with the carbon dioxide. In this way, most beneficially substantially pure CO2 is directed into the CO2 injection well 540. However, any impurities would beneficially be sequestered along with the CO2.

The CO2 is sufficiently pressurized so that the CO2 can be placed entirely down into the natural gas reservoir 550 through the CO2 injection well 540. While the reservoir 550 is preferably a reservoir of natural gas, the reservoir could be a reservoir of other gases which are suitable as fuels, including enhanced oil recovery, or could be utilized to remove other gases or liquids which are contained within subterranean reservoirs. The high pressure CO2 both repressurizes the natural gas reservoir 550 and also can have an affect on the ability of the natural gas or other compounds within the reservoir to separate from other structures within the reservoir so that the natural gas or other compounds within the reservoir are more easily removed from the reservoir 550.

Particularly, a natural gas production well 560 is utilized to pump natural gas out of the natural gas reservoir 550. The natural gas production well 560 would typically initially receive an enhanced amount of natural gas therefrom, due to repressurizing the natural gas reservoir with the carbon dioxide. Note that because carbon dioxide is a heavier compound than methane, which makes up the primary component of natural gas, the methane would tend to rise within the natural gas reservoir 550 with the carbon dioxide tending to pool within the reservoir 550, so that enhanced production of natural gas out of the natural gas production well 560 would result.

Over time, typically a greater and greater percentage of carbon dioxide would be included in the natural gas removed from the natural gas production well 560. If needed, such carbon dioxide could be removed from the natural gas for beneficial industrial use, or for resequestration. Most preferably, however, the combined natural gas and carbon dioxide from the natural gas production well 560 would be directed back to the fuel inlet 432 of the gas generator 430, typically through some intermediate fuel storage tank.

When the system 410 of this invention initially commences operation, the fuel would be primarily the methane within the natural gas. Over time, an amount of carbon dioxide within the natural gas would increase. The percentage of carbon dioxide within the fuel entering the gas generator 430 through the fuel inlet 432 could be monitored, such that the appropriate amount of oxygen is adjusted to maintain substantially stoichiometric combustion within the gas generator 430.

The carbon dioxide entering the gas generator 430 along with the methane would pass through the gas generator 430 and mix with the products of combustion within the gas generator 430 and released from the gas generator 430 at the discharge 438. Because the products of combustion within the gas generator 430 are steam and carbon dioxide, having additional carbon dioxide within the fuel would not add an additional constituent to the products of combustion within the gas generator 430. Rather, the only effect would be that a ratio of steam to carbon dioxide would be slightly altered as the amount of carbon dioxide within the fuel increases.

At some point, the amount of carbon dioxide within the natural gas produced from the natural gas production well 560 would be sufficiently high that no further practical energy can be removed from the natural gas reservoir 550. The natural gas production well 560 would then typically be capped, with the carbon dioxide remaining within the natural gas reservoir 550 for effective sequestration out of the atmosphere. The power generation system would be configured to be mobile in one embodiment, such a system 410 could move between natural gas reservoirs 550 after depletion of the natural gas reservoir 550 so that operation of the system 410 could be repeated at separate locations.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A zero emissions closed Rankine cycle power generation system, comprising in combination:
    a closed Rankine cycle working fluid recirculation loop including a working fluid heater, a working fluid expander, a working fluid condenser and a working fluid pump;
    a source of oxidizer, the oxidizer being a majority oxygen;
    a source of fuel, the fuel being capable of combustion with oxygen to produce elevated temperature products of combustion;
    a combustor having an oxidizer inlet downstream from said source of oxidizer, a fuel inlet downstream from said source of fuel, said combustor adapted to combust the fuel with the oxygen to produce elevated temperature products of combustion including water and carbon dioxide, and an outlet adapted to discharge the elevated temperature products of combustion from the combustor;
    a heat exchanger downstream from said combustor outlet, said heat exchanger adapted to transfer heat from said elevated temperature products of combustion to the working fluid of said closed Rankine cycle as at least a portion of said working fluid heater; and
    wherein said source of fuel includes both hydrocarbon fuel and carbon dioxide, at least a portion of the carbon dioxide in said source of fuel being carbon dioxide formed as a product of combustion of the hydrocarbon fuel with oxygen within said combustor.

2. The system of claim 1 wherein said source of fuel includes methane.

3. The system of claim 1 wherein said combustor includes a water inlet, said combustor adapted to combine water from said water inlet with the elevated temperature products of combustion before discharge from said combustor from said outlet.

4. The system of claim 3 wherein the water produced within said combustor is at least partially routed to said water inlet, such that the water entering said combustor at said water inlet is at least partially water produced within said combustor previously.

5. The system of claim 4 wherein a condenser is located downstream of said outlet of said combustor, said condenser adapted to condense water within the products of combustion from steam to liquid water, said condenser including a liquid water outlet oriented upstream from said water inlet of said combustor; and a water preheater located between said liquid water outlet of said condenser and said water inlet of said combustor, said water preheater adapted to transfer heat from the products of combustion between said outlet of said combustor and said condenser to the water passing from said condenser to said combustor.

6. The system of claim 5 wherein said water preheater is adapted to heat the water therein sufficiently to boil the water from liquid water into steam, and wherein the water at said water inlet is steam.

7. The system of claim 1 wherein said oxygen from said source of oxidizer is in a gaseous phase.

8. The system of claim 1 wherein said oxygen from said source of oxidizer is substantially free of water until said oxygen enters said combustor.

9. The system of claim 1 wherein said source of oxidizer includes an air separator, said air separator including an inlet for air and an outlet for oxidizer which is a majority oxygen, said air separator adapted to separate at least a portion of oxygen in the air from nitrogen in the air.

10. The system of claim 1 wherein an expander is located downstream of said outlet of said combustor, said expander adapted to expand flow discharged from said combustor, said expander including a discharge.

11. The system of claim 10 wherein said expander includes at least one turbine.

12. The system of claim 10 wherein said expander is located upstream of said heat exchanger.

13. The system of claim 1 wherein the working fluid of said closed Rankine cycle recirculating loop is water.

14. The system of claim 1 wherein the system includes a separator for the products of combustion, said separator including an outlet for primarily carbon dioxide.

15. The system of claim 14 wherein said separator includes a condenser for the water, and said outlet for primarily carbon dioxide being an outlet for gases not condensing within said condenser.

16. The system of claim 15 wherein said outlet for primarily carbon dioxide includes at least one pump to pressurize the carbon dioxide to a pressure at least as great as a pressure within a terrestrial formation, and wherein said outlet for primarily carbon dioxide is coupled to a feed well adapted to deliver the carbon dioxide into the terrestrial formation.

17. The system of claim 16 wherein said terrestrial formation includes a natural gas pocket; and
wherein said source of fuel includes natural gas from said natural gas pocket to which said outlet for primarily carbon dioxide is coupled.

18. A zero emissions power generation system featuring carbon dioxide recirculation with the fuel, comprising in combination:
a source of oxidizer, the oxidizer being a majority oxygen;
a source of hydrocarbon fuel, the fuel being capable of combustion with oxygen to produce elevated temperature products of combustion including water and carbon dioxide;
a combustor having an oxidizer inlet downstream from said source of oxidizer, a fuel inlet downstream from said source of fuel, said combustor adapted to combust the fuel with the oxygen to produce the elevated temperature products of combustion, and an outlet adapted to release the elevated temperature products of combustion from the combustor;
an expander located downstream from said combustor outlet, said expander adapted to expand the products of combustion, and having a discharge; and
wherein said source of fuel includes both hydrocarbon fuel and carbon dioxide, at least a portion of the carbon dioxide in said source of fuel being carbon dioxide formed as a product of combustion of the hydrocarbon fuel with oxygen within said combustor.

19. The system of claim 18 wherein said source of fuel includes methane.

20. The system of claim 18 wherein said combustor includes a water inlet, said combustor adapted to combine water from said water inlet with the elevated temperature products of combustion before discharge from said combustor from said outlet.

21. The system of claim 20 wherein at least one of the elevated temperature products of combustion is water, and wherein the water produced within said combustor is at least partially routed to said water inlet, such that the water entering said combustor at said water inlet is at least partially water produced within said combustor previously and said water acts as at least a portion of an at least partially open direct heating Rankine cycle.

22. The system of claim 21 wherein a condenser is located downstream of said outlet of said combustor, said condenser adapted to condense water within the products of combustion from steam to liquid water, said condenser including a liquid water outlet oriented upstream from said water inlet of said combustor; and a water preheater located between said liquid water outlet of said condenser and said water inlet of said combustor, said water preheater adapted to transfer heat from the products of combustion between said outlet of said combustor and said condenser to the water passing from said condenser to said combustor.

23. The system of claim 18 wherein the system includes a separator for the products of combustion, said separator including an outlet for primarily carbon dioxide, said separator including a condenser for the water, and said outlet for primarily carbon dioxide being an outlet for gases not condensing within the condenser; and wherein said outlet for primarily carbon dioxide includes at least one pump to pressurize the carbon dioxide to a pressure at least as great as a pressure within a terrestrial formation, and wherein said outlet for primarily carbon dioxide is coupled to a feed well adapted to deliver the carbon dioxide into the terrestrial formation, the terrestrial formation adapted to deliver hydrocarbon fuel to said source of fuel.

24. The system of claim 18 wherein a heat exchanger is located downstream from said discharge, said heat exchanger adapted to transfer heat from said products of combustion to a working fluid of a closed Rankine cycle working fluid recirculation loop including a working fluid heater, a working fluid expander, a working fluid condenser and a working fluid pump, with said heat exchanger providing at least a portion of said working fluid heater.

25. An oxy-fuel combustion power generation system with at least partially CO2 recirculating sequestration, comprising in combination:
a combustor having a fuel inlet and an oxidizer inlet;
said combustor adapted to combust the hydrocarbon fuel from said fuel inlet with oxygen from said oxidizer inlet to produce products of combustion including water and carbon dioxide;
an expander adapted to expand the products of combustion and output power from the system;
a condenser adapted to condense water within the products of combustion from a gaseous phase to a liquid phase, said condenser including a liquid outlet for primarily water and a gaseous outlet for primarily carbon dioxide;
a carbon dioxide injector adapted to put CO2 from said condenser into a hydrocarbon fuel reservoir;
a hydrocarbon fuel well accessing said hydrocarbon fuel reservoir, said hydrocarbon fuel well adapted to remove a combination of hydrocarbon fuel and carbon dioxide from said hydrocarbon fuel reservoir, at least a portion of the carbon dioxide removed by said hydrocarbon fuel well being carbon dioxide put into said hydrocarbon fuel reservoir by said carbon dioxide injector; and wherein said fuel inlet of said combustor is coupled to a source of fuel including at least a portion of the carbon dioxide with the hydrocarbon fuel at the well, such that the carbon dioxide in the hydrocarbon fuel reservoir and removed therefrom through the hydrocarbon fuel well is at least partially routed into the combustor along with said hydrocarbon fuel at said fuel inlet.

26. The system of claim 25 wherein said source of fuel is adapted to receive a combination of the hydrocarbon fuel and the carbon dioxide from the hydrocarbon fuel well without removal of carbon dioxide therefrom.

27. The system of claim 25 wherein said hydrocarbon fuel is natural gas containing a majority methane.

* * * * *